United States Patent
Wang et al.

(10) Patent No.: US 9,274,724 B1
(45) Date of Patent: Mar. 1, 2016

(54) DISTRIBUTED VIRTUAL TAPE LIBRARY

(71) Applicant: CA, Inc., Islandia, NY (US)

(72) Inventors: Hao Wang, Beijing (CN); Teng Zhang, Beijing (CN); Jing Lin, Beijing (CN); Michael Chen, Beijing (CN)

(73) Assignee: CA, Inc., Islandia, NY (US)

( * ) Notice: Subject to any disclaimer, the term of this patent is extended or adjusted under 35 U.S.C. 154(b) by 316 days.

(21) Appl. No.: 13/926,359

(22) Filed: Jun. 25, 2013

(51) Int. Cl.
*G06F 3/06* (2006.01)
(52) U.S. Cl.
CPC ............ *G06F 3/0665* (2013.01); *G06F 3/0614* (2013.01); *G06F 3/0686* (2013.01)
(58) Field of Classification Search
None
See application file for complete search history.

(56) References Cited

U.S. PATENT DOCUMENTS

| | | | |
|---|---|---|---|
| 8,612,674 B2 * | 12/2013 | Asher et al. | 711/111 |
| 2003/0002405 A1 * | 1/2003 | Linder | 369/47.1 |
| 2009/0064159 A1 * | 3/2009 | LaFrese et al. | 718/104 |
| 2013/0019180 A1 * | 1/2013 | Kimbuende et al. | 715/736 |

* cited by examiner

*Primary Examiner* — Gary Portka
(74) *Attorney, Agent, or Firm* — Gilliam IP PLLC

(57) ABSTRACT

A system and method include a distributed virtual tape library node on a distributed computing system node and using a distributed computing system distributed file system to manage data on multiple nodes of the distributed computing system to form a distributed virtual tape library system. A master virtual tape library on a distributed computing system node, multiple slave virtual tape library on a different distributed computing system node, and a distributed computing system distributed file system to manage data on the master and slave virtual tape libraries form a distributed virtual tape library system.

11 Claims, 5 Drawing Sheets

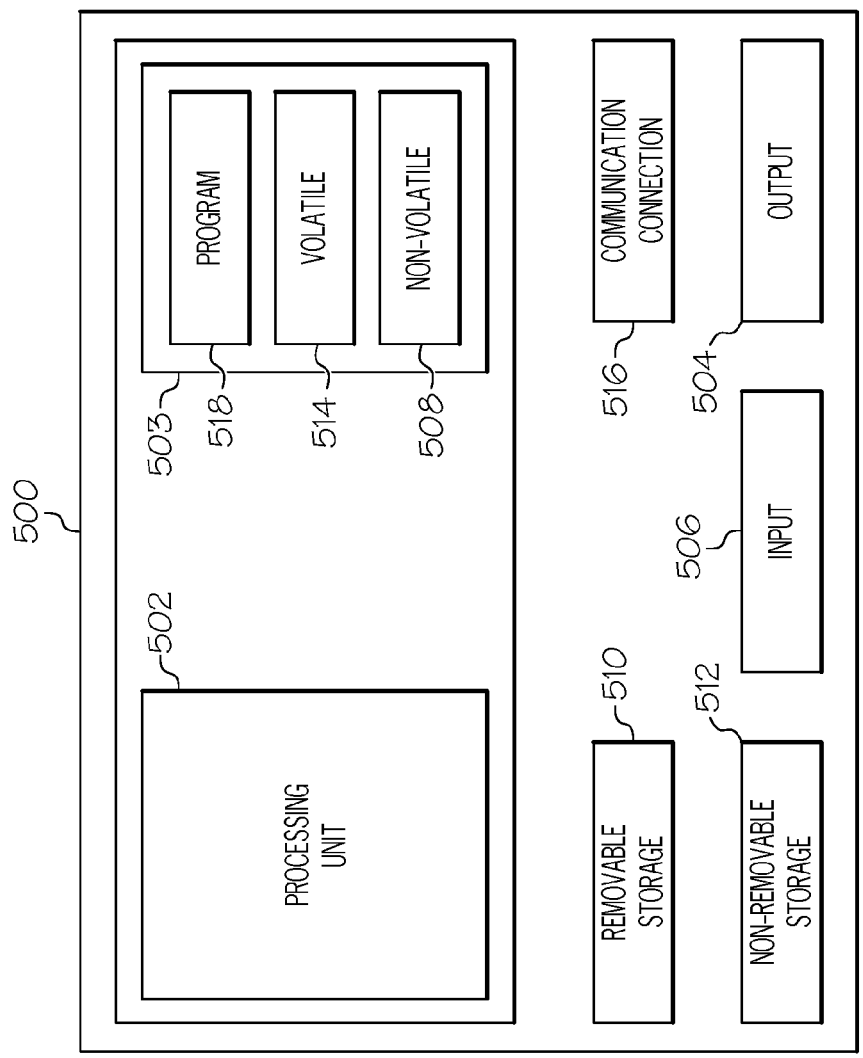

DISTRIBUTED VIRTUAL TAPE LIBRARY

BACKGROUND

Virtual tape libraries are commonly formed from sets of disk drive devices that emulate a tape drive that is commonly used for backing up large sets of data and recovering from failures. Virtual tape libraries provide benefits over tape drives due to their ability to provide faster restore processes due to its ability to provide data in a non-streaming manner. Tape drives historically have involved the removal of tapes from electrical power. Disk drives are always coupled to electrical power, making data recovery not subject to reconnecting data storage devices and hence faster.

BRIEF SUMMARY

A system and method include a distributed virtual tape library node on a distributed computing system node and using a distributed computing system distributed file system to manage data on multiple nodes of the distributed computing system to form a distributed virtual tape library system. A master virtual tape library on a distributed computing system node, multiple slave virtual tape libraries on a different distributed computing system node, and a distributed computing system distributed file system to manage data on the master and slave virtual tape libraries form a distributed virtual tape library system.

In a further aspect of the present disclosure, a system and method include a master virtual tape library on a distributed computing system node, multiple slave virtual tape libraries on a different distributed computing system node, and a distributed computing system distributed file system to manage data on the master and slave virtual tape libraries comprising a distributed virtual tape library system.

A further aspect of the present disclosure is a system that includes a virtual tape library system on a distributed computing system node and a distributed file system running on the distributed computing system node to manage data on multiple nodes comprising a distributed virtual tape library system.

BRIEF DESCRIPTION OF THE DRAWINGS

Aspects of the present disclosure are illustrated by way of example and are not limited by the accompanying figures with like references indicating like elements.

FIG. 5 is a block schematic diagram of a computer system to implement a distributed virtual tape library node in a distributed computer system according to an example embodiment.

DETAILED DESCRIPTION

Figure 1:
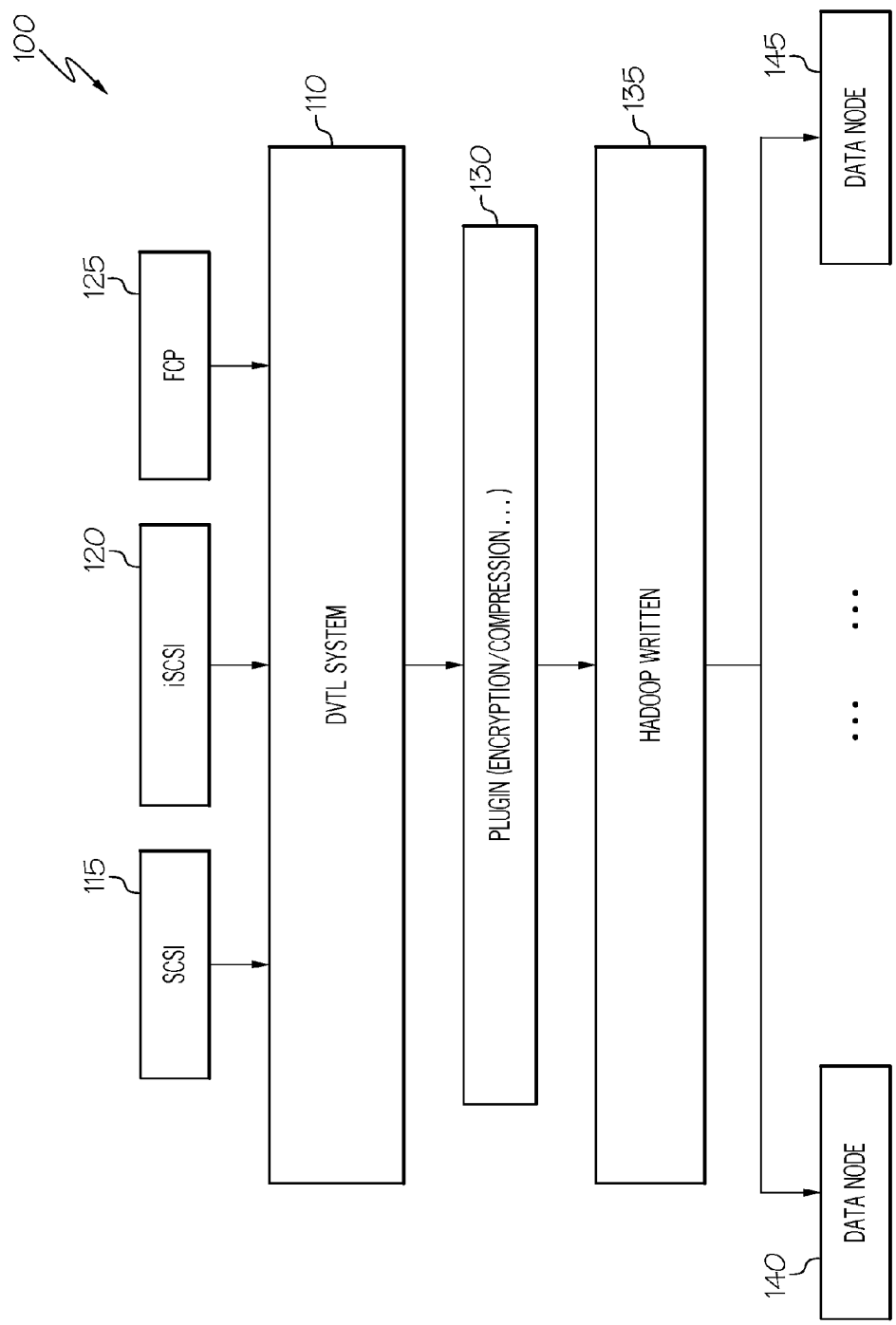
FIG. 1 is a block diagram of a distributed virtual tape library system according to an example embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Hadoop, as that term is used in this application represents one open source implementation of a distributed computing system that can divide applications into multiple pieces for execution on many different networked nodes. The distributed computing system is not limited to an open source framework in various embodiments. The distributed computer system implements a map reduce function to divide an application into many small fragments of work, each of which may be executed or re-executed on any node of the distributed computing system. In addition, the distributed computing system provides a distributed file system that stores data on the compute nodes, providing very high aggregate bandwidth across the distributed computing system. Both map/reduce and the distributed file system are designed so that node failures may be automatically handled by the framework. The distributed computing system enables applications to work with thousands of computation-independent computers and petabytes of data.

Each datanode serves up blocks of data over the network using a block protocol specific to hadoop distributed file system (HDFS). The file system uses the TCP/IP layer for communication. Clients use Remote procedure call (RPC) to communicate between each other. HDFS stores large files (an ideal file size is a multiple of 64 MB), across multiple machines. It achieves reliability by replicating the data across multiple hosts, and hence does not require RAID storage on hosts. With the default replication value, three, data is stored on three nodes: two on the same rack, and one on a different rack. Data nodes can talk to each other to rebalance data, to move copies around, and to keep the replication of data high. HDFS is not fully POSIX compliant, because the requirements for a POSIX file system differ from the target goals for a Hadoop application. The tradeoff of not having a fully POSIX-compliant file system is increased performance for data throughput and support for non-POSIX operations such as Append. HDFS was designed to handle very large files.

HDFS has recently added high-availability capabilities, allowing the main metadata server (the namenode) to be failed over manually to a backup in the event of failure. Automatic fail-over is being developed as well. Additionally, the file system includes what is called a secondary namenode, which misleads some people into thinking that when the primary namenode goes offline, the secondary namenode takes over. In fact, the secondary namenode regularly connects with the primary namenode and builds snapshots of the primary namenode's directory information, which is then saved to local or remote directories. These checkpointed images can be used to restart a failed primary namenode without having to replay the entire journal of file-system actions, then to edit the log to create an up-to-date directory structure. Because the namenode is the single point for storage and management of metadata, it can be a bottleneck for supporting a huge number of files, especially a large number of small files. HDFS Federation is a new addition that aims to tackle this problem to a certain extent by allowing multiple name spaces served by separate namenodes.

An advantage of using HDFS is data awareness between the job tracker and task tracker. The job tracker schedules map or reduce jobs to task trackers with an awareness of the data location. An example of this would be if node A contained data (x,y,z) and node B contained data (a,b,c). Then the job tracker will schedule node B to perform map or reduce tasks on (a,b,c) and node A would be scheduled to perform map or reduce tasks on (x,y,z). This reduces the amount of traffic that goes over the network and prevents unnecessary data transfer. When Hadoop is used with other file systems this advantage is not always available. This can have a significant impact on job-completion times, which has been demonstrated when running data-intensive jobs.

File access can be achieved through the native Java API, the Thrift API to generate a client in the language of the users' choosing (C++, Java, Python, PHP, Ruby, Erlang, Perl, Haskell, C#, Cocoa, Smalltalk, and OCaml), the command-line interface, or browsed through the HDFS-UI webapp over HTTP.

HDFS was designed for mostly immutable files and may not be suitable for systems requiring concurrent write operations.

Another limitation of HDFS is that it cannot be mounted directly by an existing operating system. Getting data into and out of the HDFS file system, an action that often needs to be performed before and after executing a job, can be inconvenient. A File system in Userspace (FUSE) virtual file system has been developed to address this problem, at least for Linux and some other Unix systems.

FIG. 1 is a logical block diagram of a distributed virtual tape library indicated generally at 100. A distributed virtual tape library front end system 110 implements a virtual tape library header that provides an interface and functions as a tape library. System 110 provides multiple interfaces to communicate using different storage protocols, such as SCSI 115, iSCSI 120, and FCP 125 for example so that users of the distributed virtual tape library see and interact with the library as though it were one of many different types of virtual tape libraries while actually interacting with a distributed virtual tape library that leverages a multiple node system, taking advantage of parallel processing and data storage features. The distributed virtual tape library 100 in one embodiment can perform all the functions performed by regular virtual tape libraries, such as for example, simulate different tapes, import/export tapes, archive tapes, etc.

Using the different interfaces, the system 110 can be integrated into any system as a device in the frontend. A plugin 130 provides encryption and compression services, and couples the system 110 to a distributed system, such as a Hadoop system 135 to couple to multiple data nodes indicated at 140 and 145. The Hadoop system 135 determines where, for example, that data is stored. Thus, a distributed virtual tape library system 110 is deployed on top of a system with a distributed file management system having multiple nodes, including a master node and multiple slave nodes. The same master and slave nodes may also function together in the same manner to provide storage for the distributed virtual tape library system 110, each node running an instance of the system 110 in either a master or slave mode. The use of a distributed virtual file system such at that implemented by hadoop may provide additional data redundancy over prior virtual tape library systems.

In various embodiments, a master node performs map reduce functions to distribute workload for users requests to the distributed virtual tape library system to multiple nodes, including a master node and multiple slave nodes. Thus, the master node and the slave nodes in the system can respond to inquiries from users and other systems, such as backup requests, data requests, running applications, and other requests.

Figure 2:
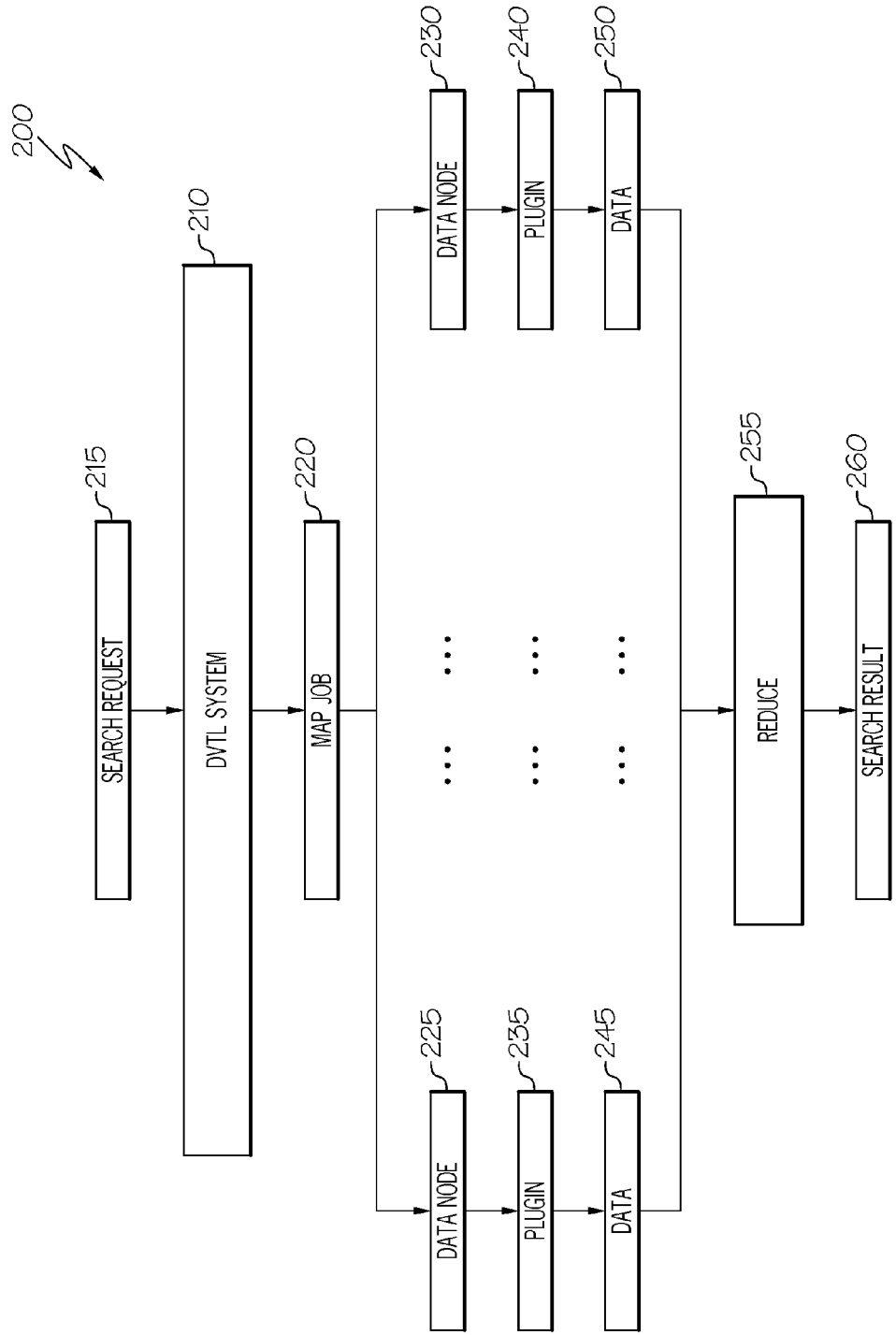
FIG. 2 is a block diagram illustrating search request processing according to an example embodiment.

FIG. 2 is a block diagram illustrating search request processing at 200 according to an example embodiment. The distributed virtual tape libraryVTL header is indicated at 210 in a node, and receives search requests as indicated at 215. Using a file search engine leveraging a map-reduce framework, the search request is mapped at 220 to multiple data nodes 225, 230. A plug in 235, 240 is used at respective nodes to process data 245, 250 from backup sessions in virtual tape library tapes that have been distributed to the nodes. At 255, the results from each of the nodes are received, and reduced to remove redundancies, and provided as a search result at 260. Leveraging the map reduce framework to perform quick searches and location files in the distributed virtual tape library allows the files to be directly accessed. There is no need to check on a backup server or software before accessing the backup files in the distributed virtual tape library.

Figure 3:
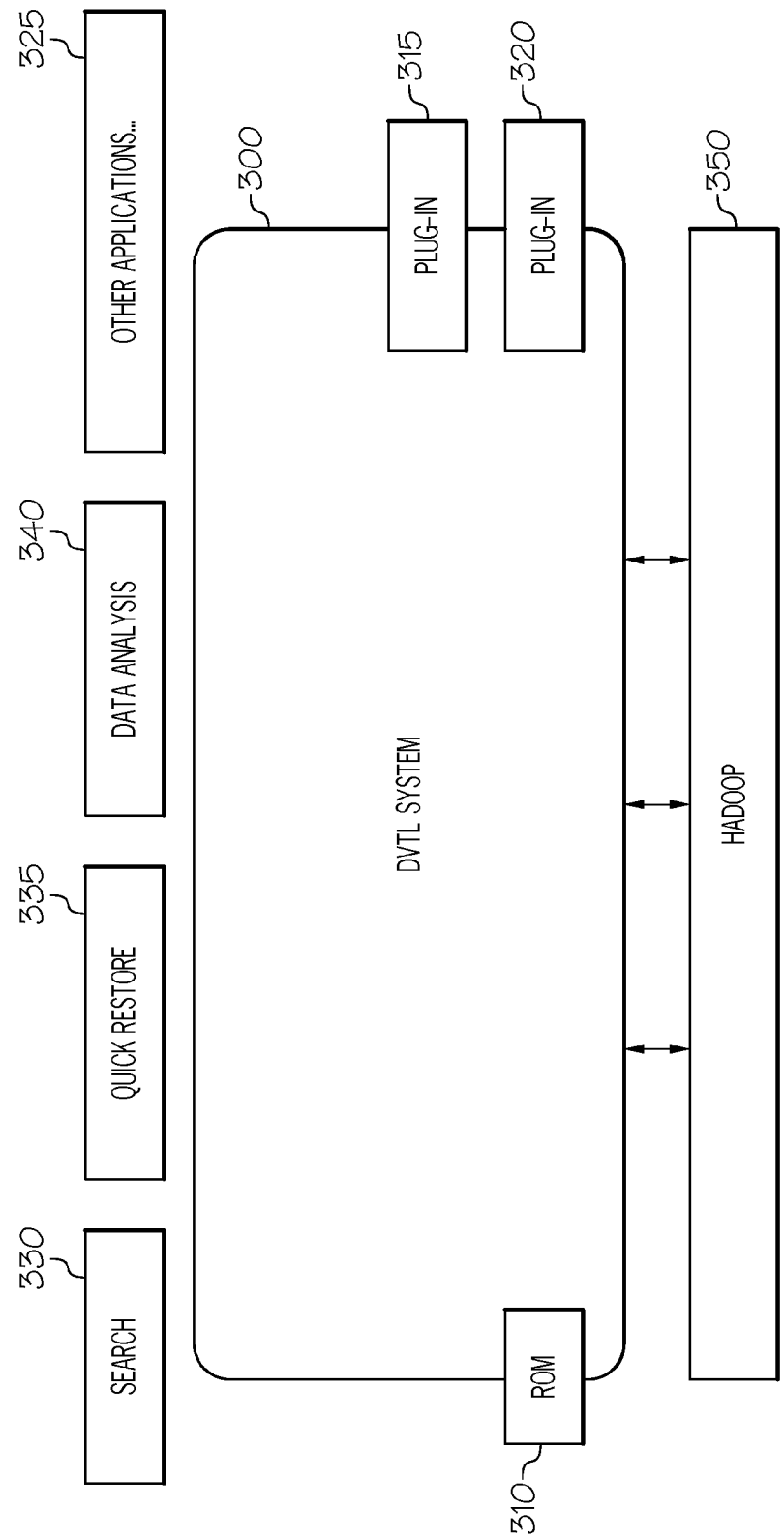
FIG. 3 is a block diagram overview of a distributed virtual tape library system according to an example embodiment.

FIG. 3 is a block diagram overview of a distributed virtual tape library system 300. System 300 utilizes one or more files, indicated as ROM 310 to simulate different types of virtual tape library systems. The files may be stored in any type of memory, and read only memory is just one example. Plug-ins 315, 320 may be used to provide different vendor specific information, such as specific data formats, compression, encryption, and other data used to process virtual tape library sessions so system communicating with the system 300 may perceive the system as a particular model and version of a virtual tape library system. System 300 can thus simulate many different types of tape library systems utilizing the ROM and plug-ins.

System 300 may include open interfaces to operate with many different applications 325. Some example applications include search 330, quick restore 335, and data analysis 340. The search 330 and quick restore 335 applications may trigger a map reduce job to hadoop system 350 to locate one or more files, allowing restore and preview of the files. Data analysis application 340 may also trigger a map reduce job to the hadoop system 350 to perform analysis on current virtual tape library sessions or status, among other functions. Within the framework of hadoop systems using multiple nodes to store data, the distributed virtual tape library system can scale from a couple of boxes to thousands of machines, each offering local computation and storage. The system can be expanded and contracted on demand.

Figure 4:
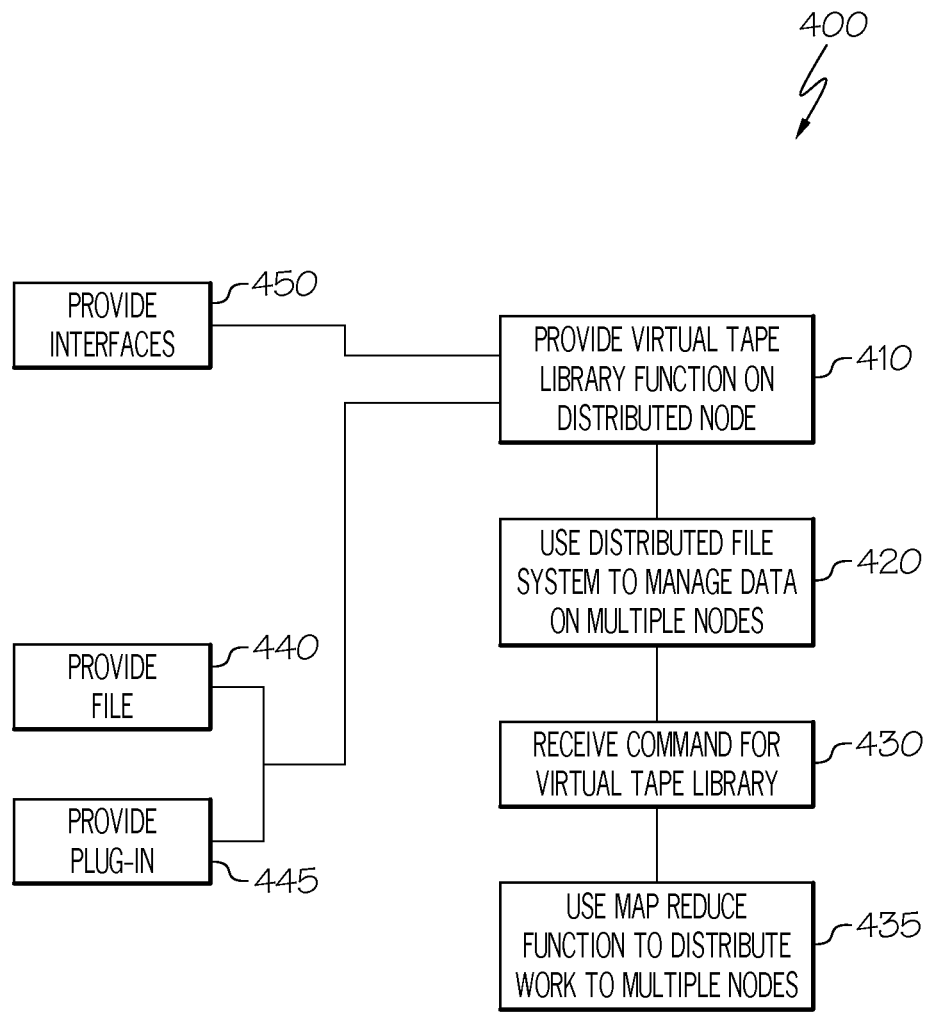
FIG. 4 is a flowchart illustrating a method for a distributed virtual tape library according to an example embodiment.

FIG. 4 is a flowchart illustrating a method 400 for a distributed virtual tape library according to an example embodiment. Method 400 includes providing distributed virtual tape library node on a distributed computing system node at 410. At 420, a distributed computing system distributed file system is used to manage data on multiple nodes of the distributed computing system to form a distributed virtual tape library system.

In one embodiment, a tape backup command is received at 430, and at 435, a map-reduce function is used to divide the backup command into multiple tasks for distribution to multiple nodes of the distributed computing system. The map reduce function may be performed by a master node of the distributed computing system, and the multiple nodes may include multiple slave nodes. The same method may also be used for search commands and save restore commands in further embodiments.

In one embodiment, at 440, a file is provided on the virtual tape library node to identify the type of virtual tape library. A plug-in may also be provided at 445 on the virtual tape library node to identify a tape format supported by the virtual tape library node. At 450, an interface is provided on the distributed virtual tape library node for applications. The applications comprise data analysis applications as well as other applications.

FIG. 5 is a block schematic diagram of a computer system 500 to implement a distributed virtual tape library node in a distributed computer system according to an example embodiment. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 500, may include a processing unit 502, memory 503, removable storage 510, and non-removable storage 512. Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 500 may include or have access to a computing environment that includes input 506, output 504, and a communication connection 516. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 502 of the computer 500. A hard drive, CD-ROM, and RAM are some examples of articles including a non-transitory computer-readable medium. For example, a computer program 518 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 500 to provide generic access controls in a COM based computer network system having multiple users and servers.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method for implementing a distributed virtual tape library system that includes disk drive devices that emulate a tape drive, said method comprising:
   providing a master virtual tape library node on a distributed computing system node;
   providing multiple slave virtual tape library nodes each on respective ones of multiple different distributed computing system nodes;
   providing a file on one or more of the master virtual tape library node and the slave virtual tape library nodes to identify a virtual tape library type;
   using a distributed file system to manage data on the master virtual tape library node and the multiple slave virtual tape library nodes; and
   using a map-reduce function in conjunction with the distributed file system to process application requests, wherein said using the map-reduce function in conjunction with the distributed file system includes,
      receiving an application request; and
      using the map-reduce function to divide the application request into multiple tasks, wherein the map-reduce function distributes each of the multiple tasks to any one of the multiple slave virtual tape library nodes of the distributed virtual tape library system.

2. The method of claim 1, and further comprising:
   receiving a tape backup command; and
   using the map-reduce function to divide the tape backup command into multiple tasks for distribution among multiple nodes of the distributed virtual tape library system.

3. The method of claim 1, and further comprising providing a plug-in on one or more of the master virtual tape library node and the slave virtual tape library nodes to identify a supported tape format.

4. The method of claim 1, and further comprising:
   receiving a file search command; and
   using the map-reduce function to divide the file search command into multiple tasks for distribution to the master virtual tape library node and one or more of the multiple slave virtual tape library nodes.

5. The method of claim 1, and further comprising:
   receiving a quick restore command; and
   using the map-reduce function to divide the quick restore command into multiple tasks for distribution to the master virtual tape library node and one or more of the multiple slave virtual tape library nodes.

6. The method of claim 1, and further comprising providing an application interface on one or more of multiple nodes of the distributed virtual tape library system.

7. A system comprising:
   a virtual tape library system that includes disk drive devices that emulate a tape drive, wherein the virtual tape library system includes,
      a master virtual tape library node configured on a distributed computing system node;
      multiple slave virtual tape library nodes each on respective ones of multiple different distributed computing system nodes;
      a file on one or more of the master virtual tape library node and the slave virtual tape library nodes that identifies a virtual tape library type; and
      a distributed file system configured to execute on the distributed computing system node to manage data on the master virtual tape library node and the multiple slave virtual tape library nodes, wherein the virtual tape library system is adapted to use a map-reduce function in conjunction with the distributed file system to process application requests, wherein said the virtual tape library function adapted to use the map-reduce function comprises the virtual tape library adapted to,
         receive an application request; and
         use the map-reduce function to divide the application request into multiple tasks, wherein the map-reduce function is adapted to distribute each of the multiple tasks to any one of the multiple nodes of the virtual tape library system.

8. The system of claim 7, wherein the master virtual tape library node is adapted to:
receive a tape backup command; and
use the map-reduce function to divide the tape backup command into multiple tasks for distribution among the multiple slave virtual tape library nodes.

9. The system of claim 7, wherein the virtual tape library system is adapted to provide a plug-in on one or more of the master virtual tape library node and the slave virtual tape library nodes to identify a supported tape format.

10. The system of claim 7, wherein the virtual tape library system is adapted to:
receive a file search command; and
use the map-reduce function to divide the file search command into multiple tasks for distribution to the master virtual tape library node and one or more of the multiple slave virtual tape library nodes.

11. The system of claim 7, wherein the virtual tape library system is adapted to:
receive a quick restore command;
use the map-reduce function to divide the quick restore command into multiple tasks for distribution to the master virtual tape library node and one or more of the multiple slave virtual tape library nodes; and
provide an application interface on one or more of the multiple nodes of the virtual tape library system.

* * * * *